(12) United States Patent
Marsh et al.

(10) Patent No.: US 8,136,643 B2
(45) Date of Patent: Mar. 20, 2012

(54) LOCOMOTIVE DYNAMIC BRAKING GRID PACKAGE CONFIGURATION

(75) Inventors: Gregory Alan Marsh, Erie, PA (US); Theodore Clark Brown, Ripley, NY (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/759,739

(22) Filed: Apr. 14, 2010

(65) Prior Publication Data
US 2010/0203820 A1   Aug. 12, 2010

Related U.S. Application Data

(63) Continuation of application No. 11/156,400, filed on Jun. 20, 2005, now Pat. No. 7,721,855.

(60) Provisional application No. 60/590,554, filed on Jul. 23, 2004.

(51) Int. Cl.
*F16D 65/847* (2006.01)
*F16D 65/12* (2006.01)
*B61D 27/00* (2006.01)

(52) U.S. Cl. ............ 188/264 A; 188/164 R; 188/264 F; 188/3 R; 454/83

(58) Field of Classification Search ............... 188/264 A, 188/264 R, 264 F; 454/68, 167, 83–86
See application file for complete search history.

(56) References Cited

U.S. PATENT DOCUMENTS 6,430,045 B1 * 8/2002 Everitt ............... 361/690
* cited by examiner

*Primary Examiner* — Steve McAllister
*Assistant Examiner* — Helena Kosanovic
(74) *Attorney, Agent, or Firm* — GE Global Patent Operation; John A. Kramer

(57) ABSTRACT

In a locomotive having a dynamic braking capability, a method for maintaining an airflow path to a resistive grid disposed within a resistive grid enclosure having an enclosure inlet and an enclosure outlet is provided, wherein the method includes generating an inlet airflow into the enclosure inlet, creating a heated inlet airflow by associating the inlet airflow with the resistive grid such that the inlet airflow absorbs heat generated by the resistive grid, directing the heated inlet airflow toward the enclosure outlet to generate a heated outlet airflow, redirecting at least a portion of the heated outlet airflow to be thermally associated with a structural portion of the enclosure inlet such that the temperature of the structural portion of the enclosure inlet is increased above a predetermined temperature to reduce blockage of the enclosure inlet by snow and recirculating the redirected heated outlet airflow with ambient air being drawn into the resistive grid enclosure.

15 Claims, 12 Drawing Sheets

Section A-A

LOCOMOTIVE DYNAMIC BRAKING GRID PACKAGE CONFIGURATION

This application is a continuation of U.S. application Ser. No. 11/156,400, filed Jun. 20, 2005 now U.S. Pat. No. 7,721,855, which claims priority to U.S. Provisional Patent Application Ser. No. 60/590,554 filed Jul. 23, 2004, the contents of which are incorporated herein by reference in their entirety.

FIELD

The present invention relates generally to locomotive braking systems and more particularly to dynamic braking grids used in locomotives.

BACKGROUND OF THE INVENTION

Conventional rail locomotive designs typically employ a plurality of traction motors for propelling and retarding the forward and reverse motion of the locomotive. When being used to propel the locomotive the traction motors function as electric motors which convert electrical current into kinetic or mechanical energy. For example, current locomotives typically include a diesel engine which is used to drive an alternator which generates and supplies an electrical current to a plurality of traction motors which, in turn, converts this electrical energy into mechanical energy causing the locomotive to be propelled in the forward or reverse direction.

However, the traction motors may also be configured to function as generators to produce a dynamic braking action which is used to slow the movement of the locomotive by converting the kinetic energy of the locomotive into electrical energy. Unfortunately however, this electrical energy cannot be used or stored conveniently on-board the locomotive. As such, this energy must be dissipated. To accomplish this the traction motors are connected to a bank of electrical resistors called a dynamic braking grid and the electrical energy generated during the dynamic braking action is converted into thermal energy, or heat, using resistive elements within the dynamic braking grid wherein the dynamic braking grid is typically force cooled by fan-driven airflow which transfers the heat energy into the ambient environment.

However, certain design and physical characteristics of current dynamic braking grid resistor packages, such as the package size and the upper temperature limit of the materials used to construct the dynamic braking grid tend to limit the amount of dynamic braking power that may be applied to the locomotive and still be efficiently transferred into the ambient environment. This acts to limit the amount of power that may be dissipated by a grid at a given ambient condition based on temperature and pressure. For example, a typical stack of braking grids occupying a volume of approximately 50 cubic feet may only be able to dissipate 1.8 MW of power. As such, because the efficient transfer of heat energy from the resistors to the ambient environment is a critical factor to the proper performance of a dynamic braking system, it is desirable to maximize this efficiency. Unfortunately however, because current dynamic braking grid resistor package designs are subject to cost, size, weight and noise limitations and the amount of space available on board the locomotive, it is not practical to simply increase the size of the grid enclosure or the size, quantity and/or the capacity of the cooling fans and resistors.

One way that has been developed to help solve this problem involves maximizing the energy dissipated across the entire grid by minimizing "hot spots" in the braking grid while avoiding localized material failure. Referring to FIG. 1, FIG. 2 and FIG. 3, typical cooling fans provide an uneven airflow velocity distribution at the outlet of the fan, wherein the outlet airflow velocity is highest proximate the center of the fan blade and lowest at the root and tips of the fan blades. In order to control the airflow more efficiently, an airflow diffuser plate is disposed between the fan outlet and the grid package inlet. For example, a typical cooling fan 100 used in a dynamic braking grid resistor package is shown and includes an impeller fan blade 102 and a flat plate 104, wherein the flat plate 104 defines a plurality of diffuser holes 106. Flat plate 104 includes an annular ring portion 108, a central portion 110 and a plurality of corner portions 112, wherein the annular ring portion 108 is aligned with the high velocity components of the fan air flow and wherein the central portion 110 and the corner portions 112 are aligned with the low velocity components of the fan air flow. The annular ring portion 108 defines a plurality of holes 114 having a relatively low quantity and/or size and the central portion 110 and the corner portions 112 define a plurality of holes 116 having a relatively high quantity and/or size.

As can be seen in FIG. 3, the uneven distribution of openings in the flat plate 104 has the effect of making the distribution of airflow volume and velocity downstream of the flat plate 104 much more uniform than that provided at the fan outlet. Additionally, the flat plate 104 also serves to reshape the air stream from the generally circular cross-sectional shape of the cooling fan 102 into the generally rectangular cross-sectional shape of the grid package, providing a more evenly distributed airflow within the grid package. This acts to cool the resistor grid in a more evenly distributed manner. Unfortunately however, the flat plate 104 also acts as a flow restriction and causes a significant pressure drop in the air stream which reduces the mass flow rate of cooling air available for flow through the resistor grid package. This is undesirable because the cooling of the resistive elements remains inefficient.

With conventional systems having a fan and six resistors, it is difficult to lower the maximum grid operating temperature. For a standard system, due to successive grid heating, the discharge resistor experiences the highest temperature which limits the power and environmental capability of the system. Thus, the cooling of a conventional system is difficult to improve upon for a number of reasons such as, airflow could be improved via increased flow via increased fan size, but space is limiting, airflow could be improved via increased fan speed, but physical fan/motor stresses are constraining, airflow could be increased but noise levels are constraining, airflow could be increased by reducing the pressure drop across the system, but inlet losses are limited by the size of the system, and grid and diffuser losses are limited by the size of the system as well. For instance, grid pressure drops could be reduced by increasing grid spacing, but the grid would have to be larger to still maintain sufficient heat transfer area. In fact, with conventional systems, blowing snow and freezing condensation can enter the fan, resulting in it freezing.

BRIEF DESCRIPTION OF THE INVENTION

In a locomotive having a dynamic braking capability, a method for maintaining an airflow path to a resistive grid disposed within a resistive grid enclosure having an enclosure inlet and an enclosure outlet is provided, wherein the method includes generating an inlet airflow into the enclosure inlet, creating a heated inlet airflow by associating the inlet airflow with the resistive grid such that the inlet airflow absorbs heat generated by the resistive grid, directing the heated inlet airflow toward the enclosure outlet to generate a heated outlet airflow, redirecting at least a portion of the heated outlet airflow to be thermally associated with a structural portion of the enclosure inlet such that the temperature of the structural portion of the enclosure inlet is increased above a predetermined temperature to reduce blockage of the enclosure inlet by snow and recirculating the redirected heated outlet airflow with ambient air being drawn into the resistive grid enclosure.

In a locomotive with dynamic braking capability, wherein the locomotive includes a resistive grid enclosure having an enclosure inlet and an enclosure outlet, a method for reducing blockage of the enclosure inlet is provided and includes controllably operating an electric power resistance energy source to generate output energy and associating the output energy with at least one of the enclosure inlet and a structure adjacent the enclosure inlet, such that an airflow path to the enclosure inlet is kept free from obstruction.

In a locomotive having a dynamic braking capability, a resistive grid enclosure is provided and includes a first enclosure portion, wherein the first enclosure portion defines a first enclosure portion cavity. Additionally, a second enclosure portion is provided, wherein the second enclosure portion defines a second enclosure portion cavity having at least one second enclosure portion inlet, wherein the second enclosure portion is disposed adjacent to and separated from the first enclosure portion via a first enclosure portion wall, wherein the first enclosure portion wall includes at least one convection opening which communicates the first enclosure portion cavity with the second enclosure portion cavity. A third enclosure portion is also provided, wherein the third enclosure portion defines a grid cavity having at least one grid cavity outlet, wherein the third enclosure portion is disposed adjacent to and separated from the second enclosure portion via a third enclosure portion wall, wherein the third enclosure portion wall includes at least one airflow opening which communicates the second enclosure portion cavity with the third enclosure portion cavity and wherein the third enclosure portion further includes at least one airflow directional device associated with the at least one grid cavity outlet to direct air flowing out of the at least one grid cavity outlet away from the at least one second enclosure portion inlet. Furthermore, at least one transfer duct portion is provided, wherein the at least one transfer duct portion defines a duct cavity having at least one duct inlet and at least one duct outlet, wherein the at least one duct inlet is disposed to be associated with the grid cavity and wherein the at least one duct outlet is disposed within the first enclosure cavity to communicate the grid cavity with the first enclosure cavity.

A resistive grid assembly for dissipating power generated in a locomotive having a dynamic braking capability is provide, wherein the resistive grid assembly includes a resistive grid enclosure, wherein the resistive grid enclosure defines at least one enclosure inlet, at least one enclosure outlet and a resistive grid cavity, wherein the at least one enclosure inlet is communicated with the at least one enclosure outlet via the resistive grid cavity. A plurality of resistive grid elements are also provided, wherein the plurality of resistive grid elements are disposed within the resistive grid cavity in a plurality of separate element groups. Furthermore, at least one cooling device is provided, wherein the at least one cooling device is disposed to separate at least one of the plurality of separate element groups from the others of the plurality of separate element groups and wherein the at least one cooling device is configured to generate an airflow incident upon at least one of the plurality of separate element groups.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several figures.

DETAILED DESCRIPTION OF THE INVENTION

Figure 1:
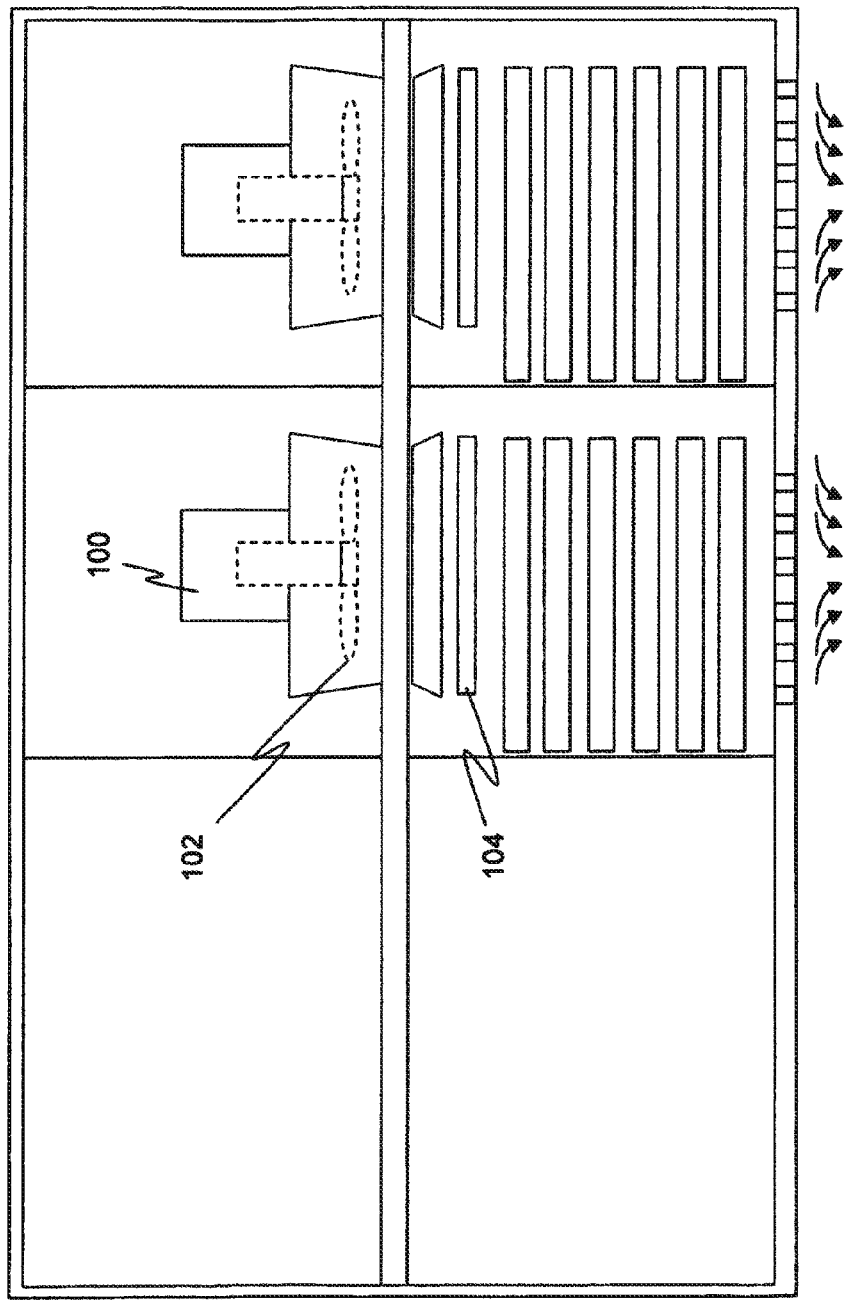
FIG. 1 is a top down view of a dynamic resistive grid package, in accordance with the prior art.
Figure 2:
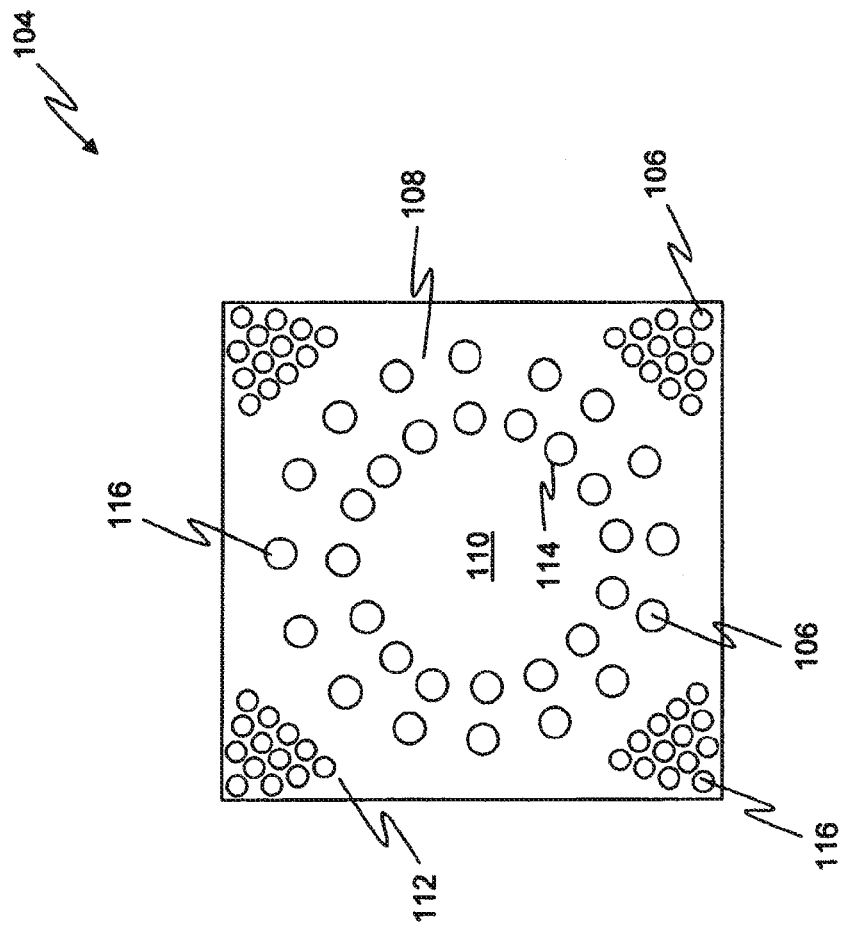
FIG. 2 is a front view of a flat plate of the prior art dynamic resistive grid package of FIG. 1.
Figure 3:
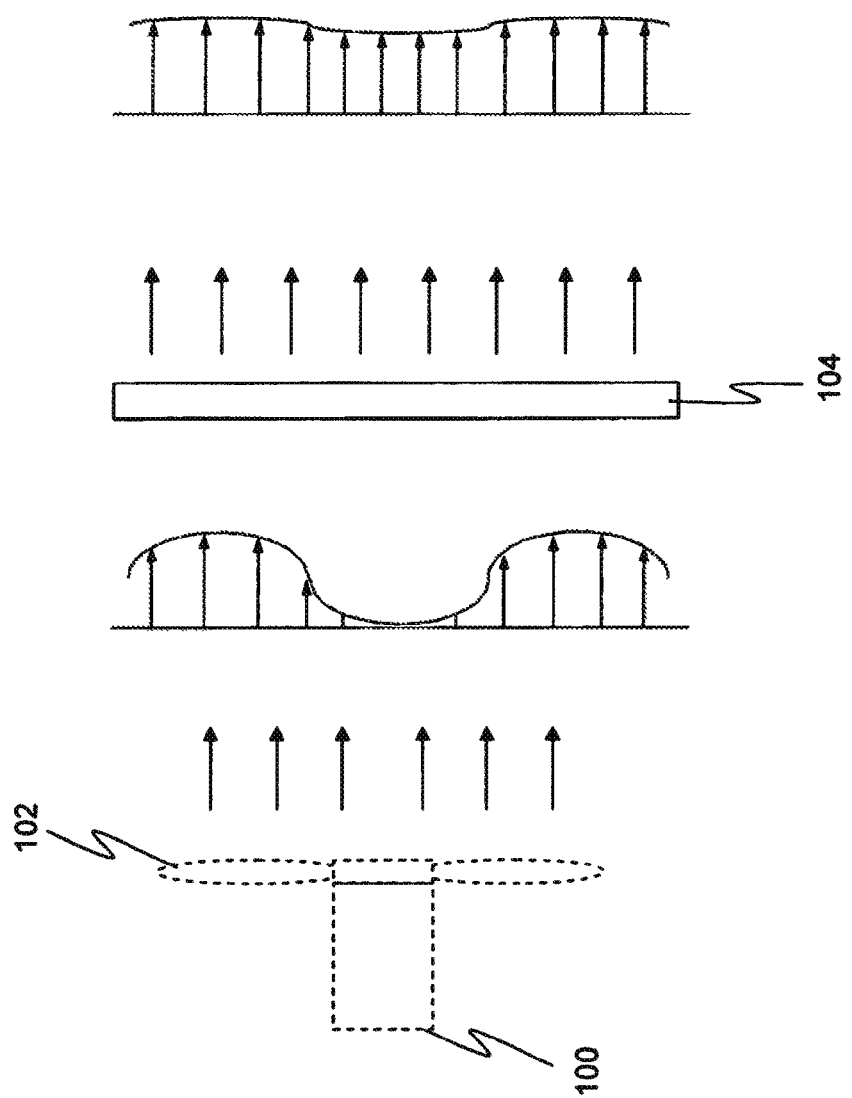
FIG. 3 is a side illustrative view of the airflow incident on a flat plate generated by a cooling fan of the prior art dynamic resistive grid package of FIG. 1.
Figure 4:
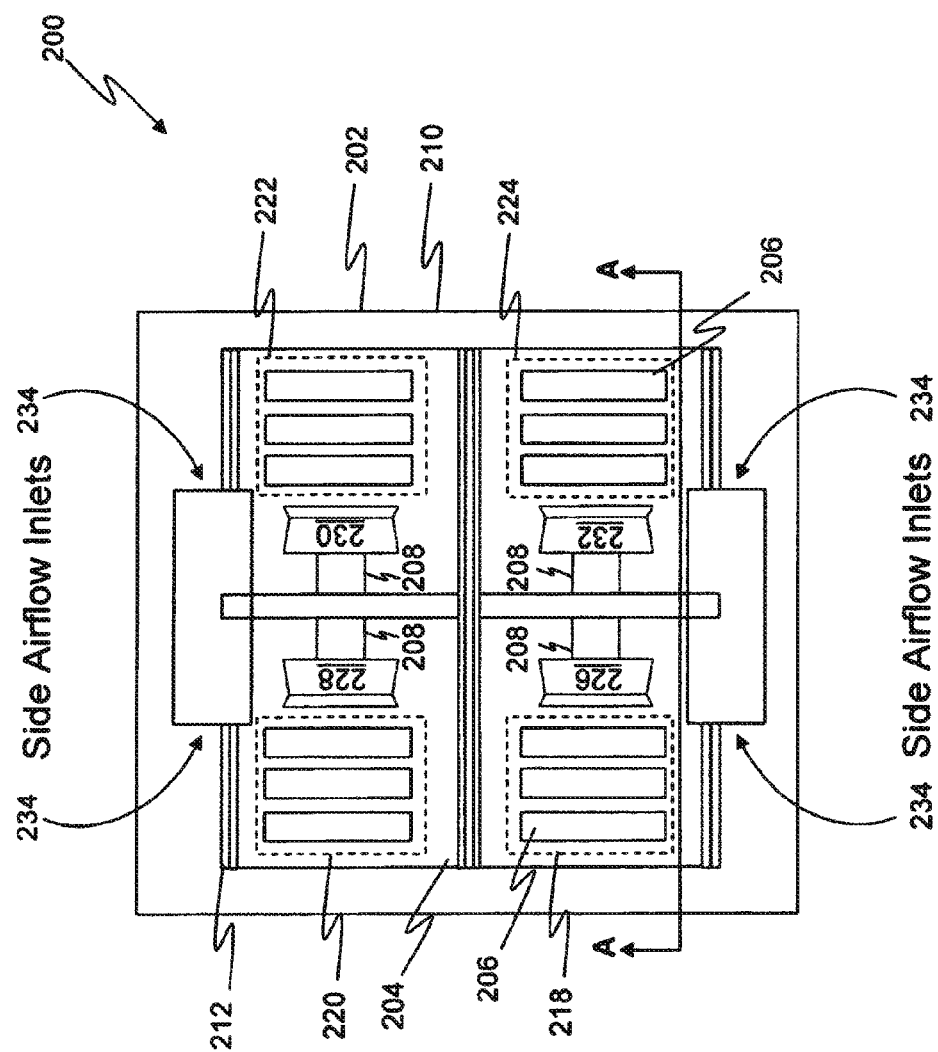
FIG. 4 is a top down view of a dynamic resistive grid package, in accordance with a first embodiment.
Figure 5:
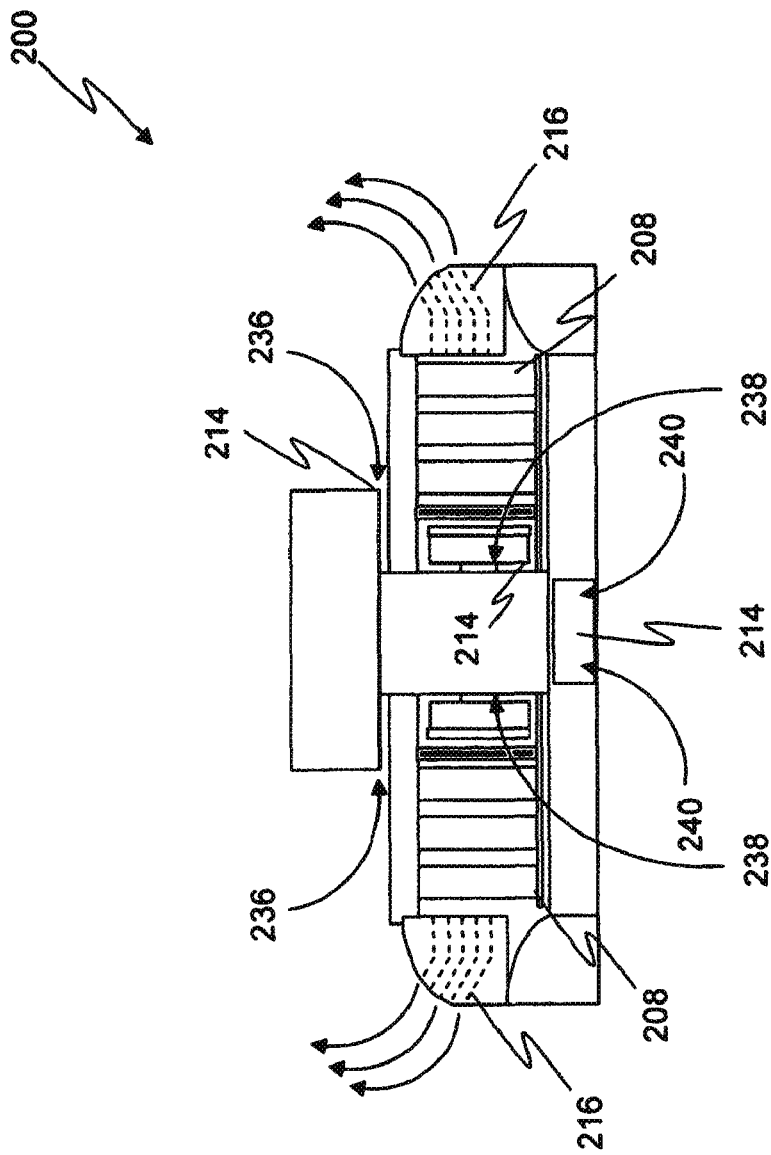
FIG. 5 is a sectional view of the dynamic resistive grid package of FIG. 4, along the lines A-A in FIG. 4.

Referring to FIG. 4 and FIG. 5, a first embodiment of a braking grid resistor package 200 is shown and includes an enclosure structure 202 defining an enclosure cavity 204 for containing a plurality of resistive elements 206 and a plurality of cooling fans 208. Enclosure structure 202 includes an outer structure 210 and an inner structure 212, wherein outer structure 210 defines a plurality of structure inlets 214 and a plurality of structure outlets 216 and wherein inner structure 212 may be used to support plurality of cooling fans 208 and plurality of resistive elements 206.

Plurality of resistive elements 206 are shown as including twelve resistive elements 206 disposed within enclosure cavity 204 to create a first resistive element group 218, a second resistive element group 220, a third resistive element group 222 and a fourth resistive element group 224. Additionally, plurality of cooling fans 208 are shown as including a first cooling fan 226, a second cooling fan 228, a third cooling fan 230 and a fourth cooling fan 232, wherein first cooling fan 226 is associated with first resistive element group 218, second cooling fan 228 is associated with second resistive element group 220, third cooling fan 230 is associated with third resistive element group 222 and fourth cooling fan 232 is associated with fourth resistive element group 224.

It should be appreciated that although first cooling fan 226 and second cooling fan 228 are shown as being powered by one electric motor and third cooling fan 230 and fourth cooling fan 232 are shown as being powered by an additional electric motor, plurality of cooling fans 208 may be powered individually via a single motor or in groups via a plurality of motors. In fact, the number of plurality of resistive elements 206 per cooling fan 208 may be chosen to optimize the performance of the system.

In the configuration of FIG. 4, each of the plurality of cooling fans 208 cools three of the plurality of resistive elements 206 to dissipate a portion of the electrical braking power of the locomotive. It should be appreciated that a fewer number of resistive element groups reduces the airflow backpressure as seen by each of the plurality of cooling fans 208, thus allowing for an increased mass flow rate of air through the resistive element groups. Furthermore, it should be appreciated that limiting the total number of resistive element groups also reduces the successive group to group heating and thus allows the maximum group operating temperature to be greatly reduced.

Referring to FIG. 5, the inlet airflow paths 234 of braking grid resistor package 200 are shown and include a top inlet airflow path 236, a side inlet airflow path 238 and a bottom inlet airflow path 240. The top inlet airflow path 236 includes four top inlet airflow elements occurring through the four sides of the top inlet section braking grid resistor package 200. The side inlet airflow path 238 also includes four airflow elements occurring through the four regions on both sides of the braking grid resistor package 200, fore and aft of the plurality of structure outlets 216. Additionally, the bottom inlet airflow paths 240 are disposed on both sides of braking grid resistor package 200 below the plurality of structure outlets 216. Typically, airflow is not permitted to enter the system from below or from the fore or aft end of the system directly into the sides of the blower motor due to interfaces with adjoining cab structures, however, bottom inlet flow path 240 allows for an improved airflow distribution and overall inlet pressure drop versus top inlet flow path 236 alone. It should be appreciated that the bottom inlet flow path 240 allows for an adequate inlet area without extending the length of the system as well as valuable inlet area which may be used in the event that the top inlet flow path 236 is blocked or covered with snow, ice, etc. . . . which is prevalent in extreme operating environments. It should also be appreciated that bottom inlet flow path 240 may be implemented as a separate duct, a plurality of separate ducts or air may be drawn in from directly and/or indirectly under the resistive elements.

However, operation of the locomotive in extreme altitudes and temperatures may even result in bottom inlet flow path 240 becoming plugged with snow, ice, etc. . . . as well. As such, venting may be used to control the inlet air temperature and provide warm air circulation when the locomotive is not in dynamic braking mode, as well as when it is in dynamic brake mode. This venting may or may not be operated as a function of the ambient temperature and will allow for a mixture of warm air from within the locomotive to be mixed with cold ambient inlet air to keep the intake region(s) free from snow and ice buildup with the sloped floor allowing for adequate drainage.

Referring again to FIG. 5, plurality of structure outlets 216 are shown and are disposed to minimize uncontrolled recirculation into the inlet paths, which may be detrimental to the cooling of the system. It should be appreciated that each of the discharge paths may share a common duct surface with the air inlet to provide heating to a portion of an inlet surface to reduce inlet freeze-up and associated blockage. Moreover, the surface may be designed to allow for a small amount of hot discharge air to bleed into the inlet via small ducts, vents, etc. . . . to further reduce the possibility of freeze-up and associated blockage. It should be appreciated that although the discharge ducting is shown as being packaged together, the discharge ducts may be separate for each grid path or may be Y-ed together to reduce discharge pressure loss.

Figure 6:
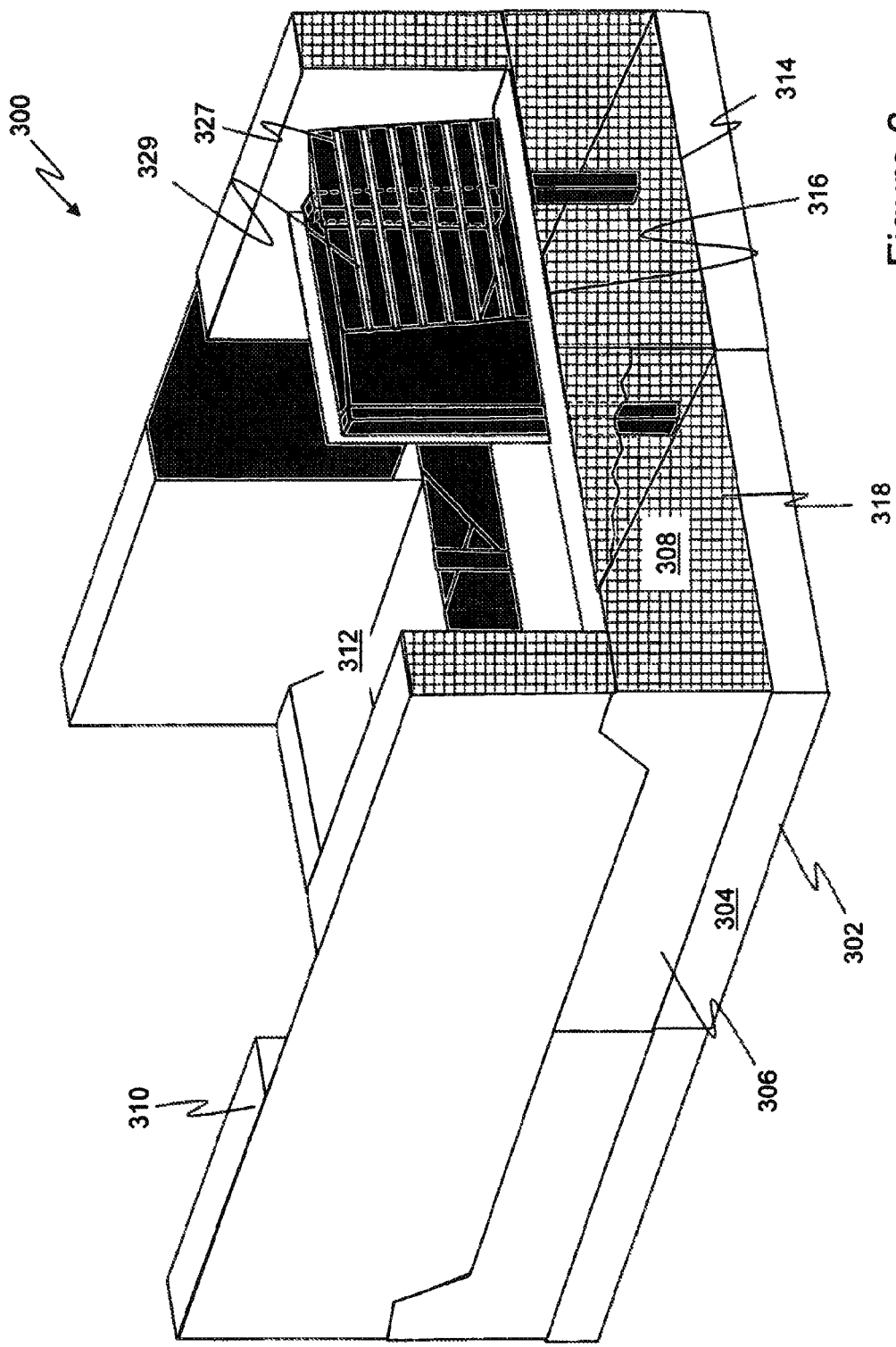
FIG. 6 is a partial side perspective view of a dynamic resistive grid package, in accordance with a second embodiment.
Figure 7:
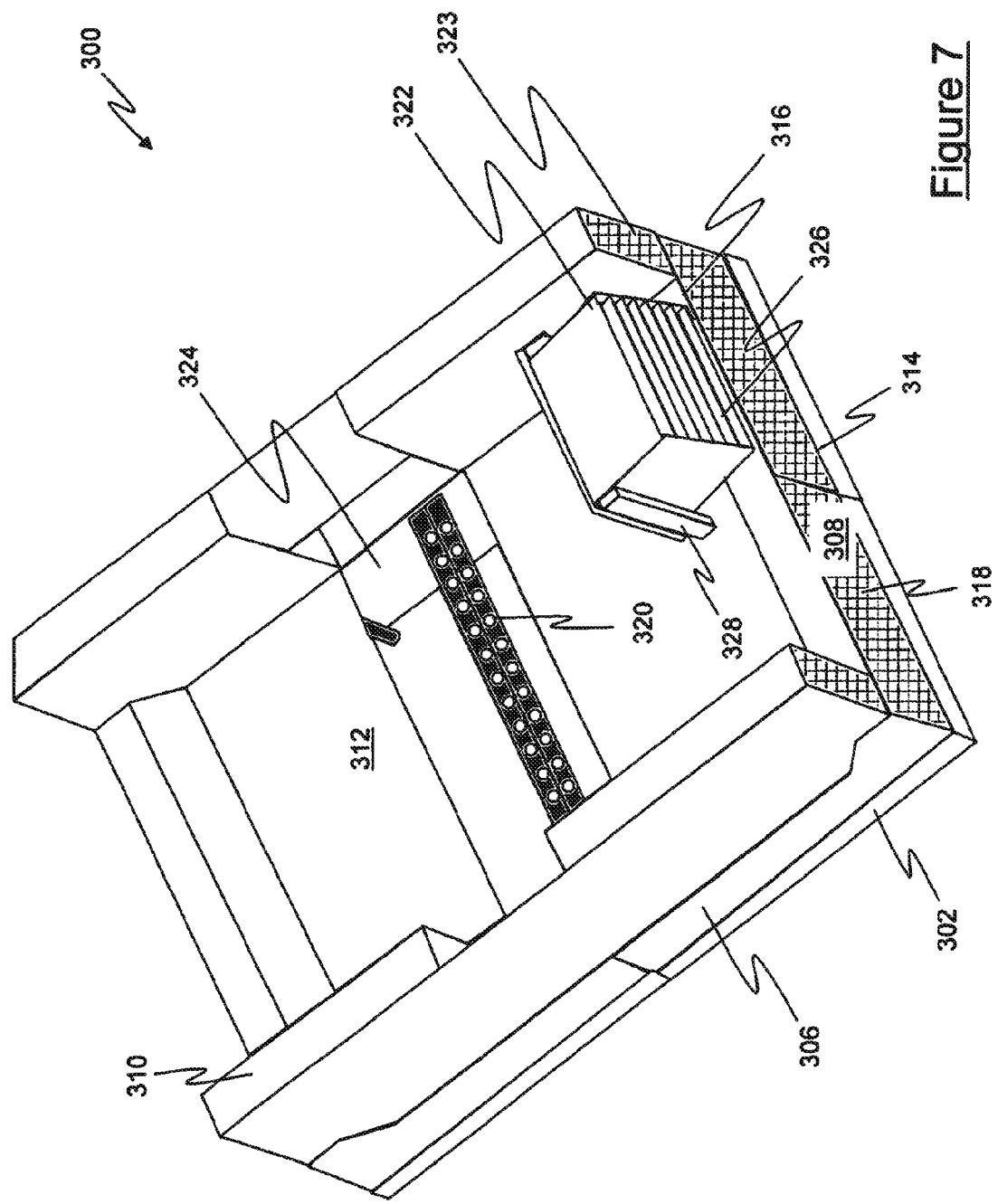
FIG. 7 is a partial top down perspective view of the dynamic resistive grid package in FIG. 6.
Figure 8:
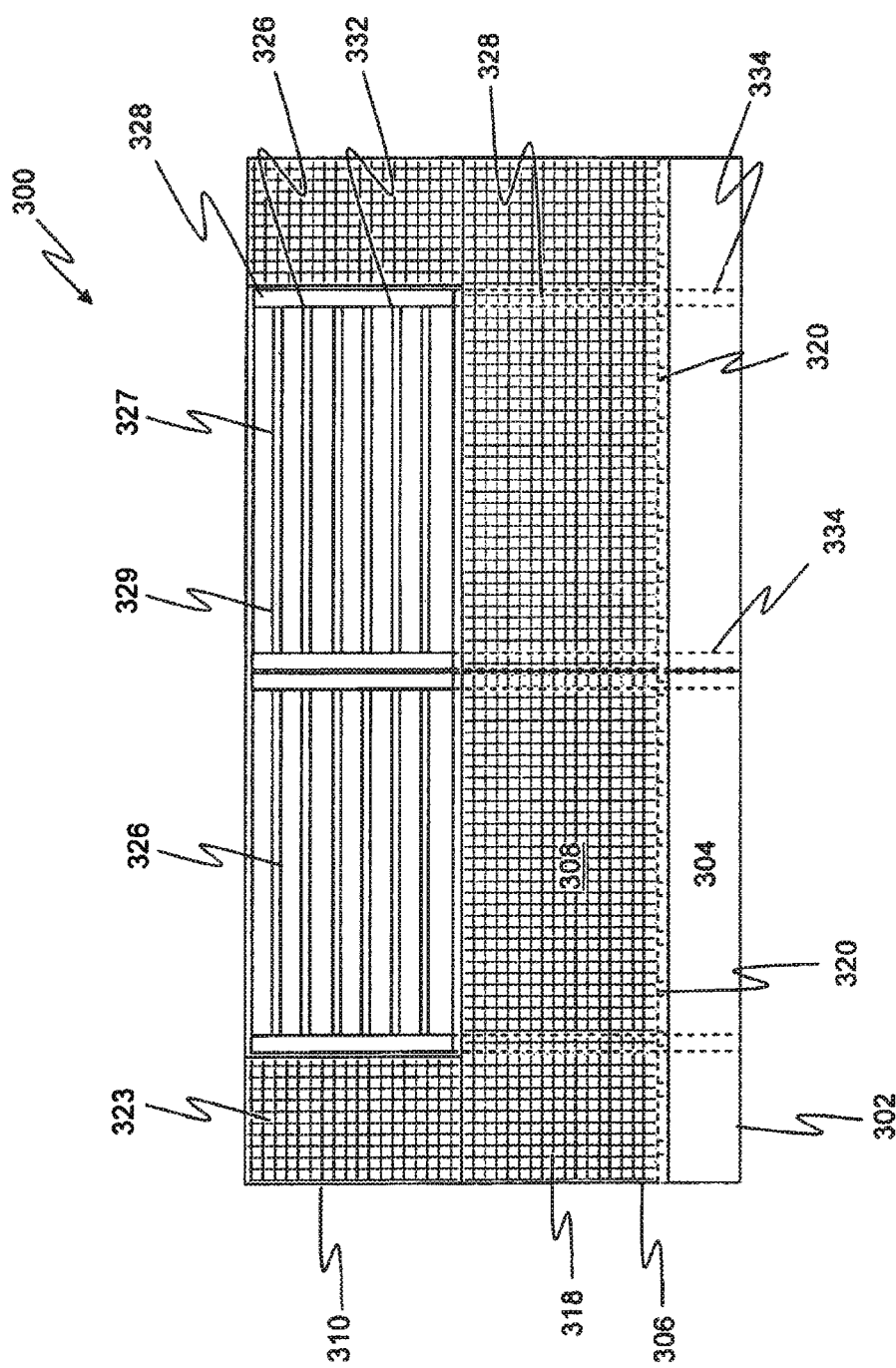
FIG. 8 is a front view of the dynamic resistive grid package in FIG. 6.

Referring to FIG. 6, FIG. 7 and FIG. 8, a second embodiment of a braking grid resistor package 300 is shown and includes a first enclosure portion 302 defining a first enclosure portion cavity 304, a second enclosure portion 306 defining a second enclosure portion cavity 308 and a third enclosure portion 310 defining a third enclosure portion cavity 312, wherein the first enclosure portion cavity 304 and the third enclosure portion cavity 312 are separated from the second enclosure portion cavity 308 via a first enclosure portion wall 314 and a third enclosure portion wall 316, respectively. The second enclosure portion 306 includes at least one second enclosure portion inlet opening 318 and at least one convection opening 320, wherein the at least one second enclosure portion inlet opening 318 is communicated with the external environment of the braking grid resistor package 300 and wherein the at least one convection opening 320 communicates the first enclosure portion cavity 306 with the second enclosure portion cavity 308.

The third enclosure portion 310 includes at least one third enclosure portion cavity outlet 322, at least one third enclosure portion cavity inlet opening 323 and at least one airflow opening 324, wherein the at least one third enclosure portion cavity outlet 322 communicates the third enclosure portion cavity 312 with the external environment of the braking grid resistor package 300 and wherein the at least one airflow opening 324 communicates the second enclosure portion cavity 308 with the third enclosure portion cavity 312. Additionally, the third enclosure portion 310 includes at least one airflow directional device 326 disposed to be associated with the at least one third enclosure portion cavity outlet 322 and configurable to controllably direct air flowing out of the at least one third enclosure portion cavity outlet 322 away from the at least one second enclosure portion inlet opening 318. Moreover, at least one transfer duct portion 328 is included, wherein the at least one transfer duct portion 328 defines a duct cavity 330 having at least one duct cavity inlet 332 and at least one duct cavity outlet 334, wherein the at least one duct cavity inlet 332 is communicated with the at least one duct cavity outlet 334 via the duct cavity 330. Furthermore, at least one transfer duct is disposed such that the at least one duct cavity inlet 332 is associated with the at least one third enclosure portion cavity outlet 322 and such that the at least one duct cavity outlet 334 is associated with the first enclosure portion cavity 304. The at least one duct cavity outlet 334 may or may not include controllably movable louvers to increase and/or decrease the amount of discharge air being directed into the at least one transfer duct portion 328. It should be appreciated that the at least one airflow directional device 326 may include a plurality of louvers 327 having a knifelike edge 329. Louvers 327 may be movable to direct heated air flowing from the duct cavity outlet 322 either away from or partially into the duct cavity inlet 332. As such, when the heated air flowing into the duct cavity inlet 332 encounters the first enclosure portion wall 314 and a third enclosure portion wall 316, heat is transferred from the heated inlet air to the first enclosure portion wall 314 and to the third enclosure portion wall 316.

Figure 9:
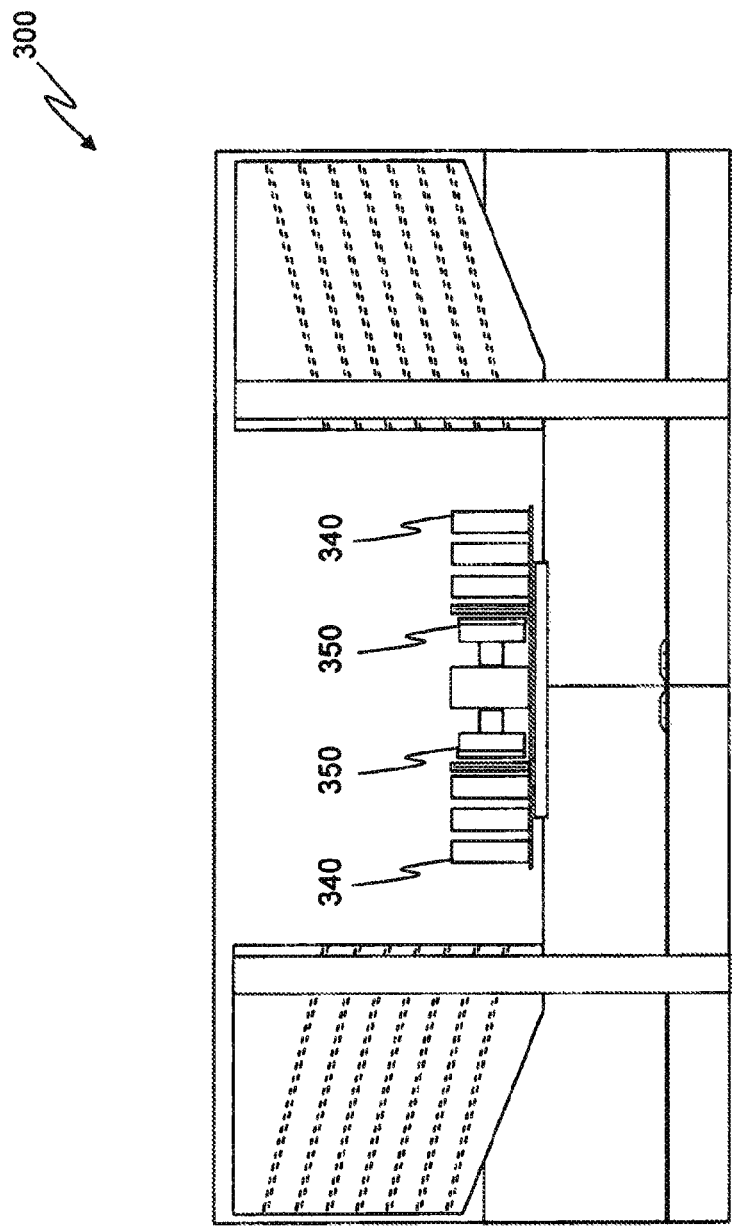
FIG. 9 is a sectional view of the dynamic resistive grid package in FIG. 6 with a resistive grid disposed within.

Referring to FIG. 9, a plurality of resistive elements 340 are shown as being disposed within the braking grid resistor package 300 to be located within the third enclosure portion cavity 312. Additionally, a plurality of cooling fans 350 are included and are disposed to be associated with at least one of the plurality of resistive elements 340. Also as above, each of the plurality of cooling fans 350 may cool three (3) of the plurality of resistive elements 340 to dissipate a portion of the electrical braking power of the locomotive. It should be appreciated that a fewer number of resistive element groups reduces the airflow backpressure as seen by each of the plurality of cooling fans 350, thus allowing for an increased mass flow rate of air through the resistive element groups. Furthermore, limiting the total number of resistive element groups may also reduce the successive group to group heating and thus may also allow the maximum group operating temperature to be greatly reduced. The embodiments disclosed herein provide for a compact design while allowing for an advance in the overall neatness of the packaging, while maintaining multiple (in this case at least four (4)) separate airflow paths.

Figure 10:
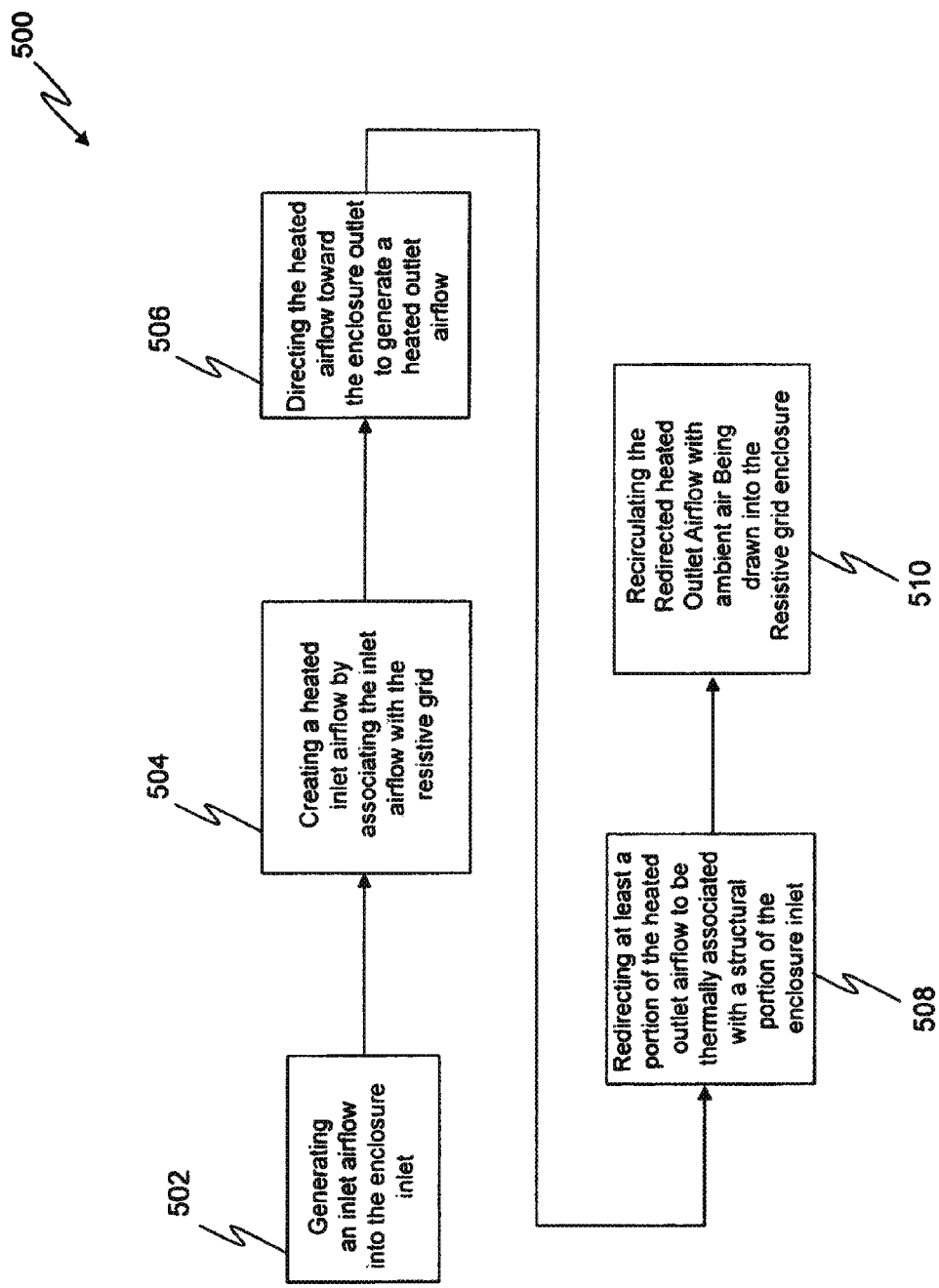
FIG. 10 is a block diagram illustrating a method for maintaining an airflow path to the resistive grid package of FIG. 1 and FIG. 6.
Figure 11:
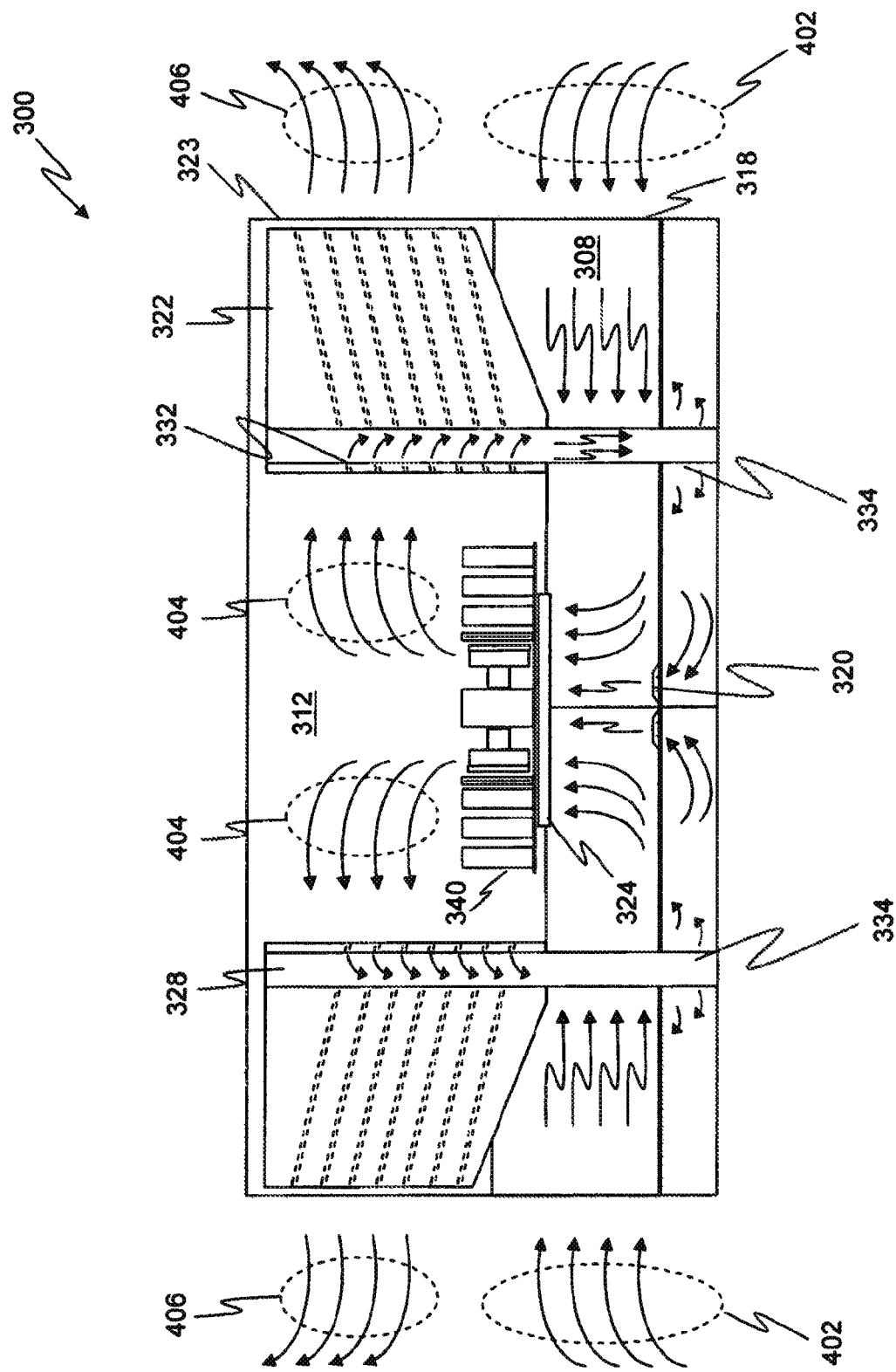
FIG. 11 is a sectional side view of the dynamic resistive grid package in FIG. 6, showing the airflow during operation.
Figure 12:
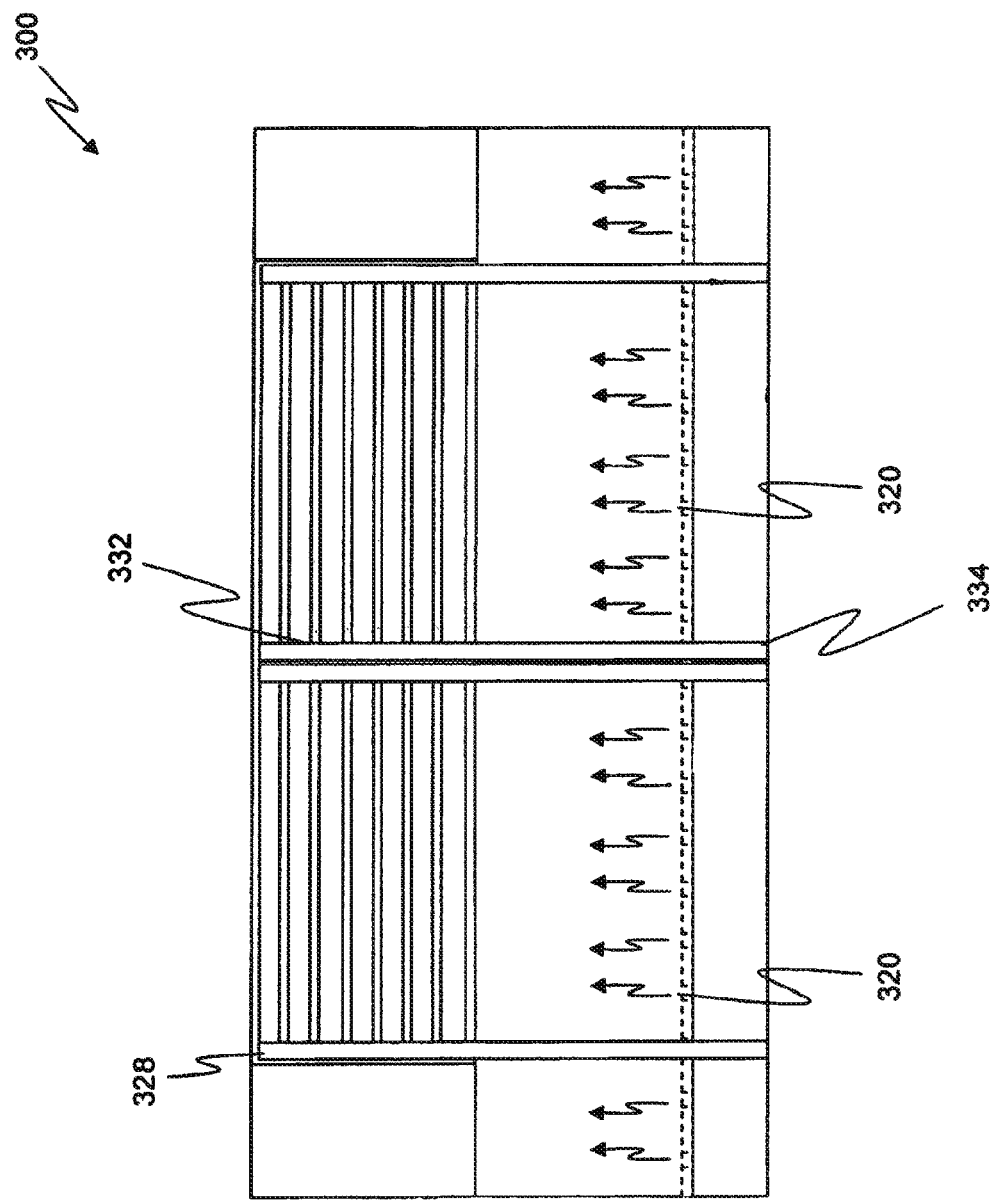
FIG. 12 is a sectional front view of the dynamic resistive grid package in FIG. 6, showing the airflow during operation.

Referring to FIG. 10, in a locomotive having a dynamic braking capability, a method 500 for maintaining an airflow path to a resistive grid disposed within a resistive grid enclosure is illustrated and discussed, wherein the method 500 includes generating an inlet airflow 402 into the at least one second enclosure portion inlet opening 318 and/or the at least one third enclosure portion cavity inlet opening 323, as shown in operational block 502. Referring to FIG. 11 and FIG. 12, this may be accomplished by at least one of propelling the locomotive to receive ambient airflow or by operating the plurality of cooling fans 350 to generate an inlet airflow 402. The inlet airflow 402 flows into the second enclosure portion cavity 308 and into the third enclosure portion cavity 312 via the at least one airflow opening 324. As the inlet airflow 402 flows through the at least one airflow opening 324, the inlet airflow 402 encounters and interacts with the plurality of resistive elements 340 to create a heated inlet airflow 404 by absorbing the heat radiated by the plurality of resistive elements 340, as shown in operational block 504.

As the heated inlet airflow 404 circulates within the third enclosure portion cavity 312 the flow of the circulation directs the heated inlet airflow 404 toward the at least one third enclosure portion cavity outlet 322 to generate a heated outlet airflow 406, as shown in operational block 506. As the heated outlet airflow 406 flows out of the at least one third enclosure portion cavity outlet 322, a portion (which may or may not be predetermined) of the heated outlet airflow 406 is redirected into the at least one duct cavity inlet 332 and/or through the at least one transfer duct portion 328 and out of the at least one duct cavity outlet 334 into the first enclosure portion cavity 304, as shown in operational block 508. This redirection of a portion of the heated outlet airflow raises the temperature of the first enclosure portion wall 314 to prevent/reduce the buildup of blockage material, such as snow and/or ice. The remaining portion of the heat outlet airflow 406 flows out of the at least one third enclosure portion cavity outlet 322 and is controllably directed away from the at least one second enclosure portion inlet opening 318 to prevent heated air from being re-ingested into the braking grid resistor package 300. The redirected portion of heated outlet airflow 406 is then re-circulated with the ambient air being drawn into the at least one second enclosure inlet opening 318 via at least one convection opening 320. Additionally, as the heated outlet airflow 406 flows out of the at least one third enclosure portion cavity outlet 322, a predetermined portion of the heated outlet airflow 406 may also be redirected into the at least one second enclosure portion inlet opening 318 to increase the temperature of the third enclosure portion wall 316.

It should be appreciated that inlet and outlet airflow paths may be disposed adjacent each other by means of airflow directional control via louvers, etc. in order to minimize uncontrolled mixing of the airflow paths and recirculation. It should also be appreciated that as disclosed herein, these issues are addressed by redistributing the grid arrangement such that three (3) grids are cooled per airflow path. Additionally, by utilizing top, bottom, and side inlets, appreciable inlet area is achieved, holding inlet pressure losses to a minimum, without increasing the length of the system. Warm air circulating techniques are being proposed to reduce inlet freezing concerns. Moreover, side or bottom inlet ducts may be implemented. This approach would add additional inlet area to lower inlet losses and opens up the possibility to bring a small amount of warm discharge air into the inlet area to reduce freeze-up risks. A top inlet may also be utilized to reduce inlet losses. It should be further appreciated that sensors, such as temperature, airflow and/or oxygen sensors, may be located within the braking grid resistor package 300 to monitor the temperature, airflow and/or oxygen within the braking grid resistor package 300. Additionally, these sensors may be associated with the plurality of louvers 327 to allow the plurality of louvers 327 to be automatically adjusted to increase and/or decrease the amount of warm discharge air being recirculated.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. In a vehicle having a dynamic braking capability, a resistive grid assembly comprising:
   a first enclosure portion, wherein said first enclosure portion defines a first enclosure portion cavity;
   a second enclosure portion, wherein said second enclosure portion defines a second enclosure portion cavity having at least one second enclosure portion inlet, wherein said second enclosure portion is disposed adjacent to and separated from said first enclosure portion via a first enclosure portion wall, wherein said first enclosure portion wall includes at least one convection opening which communicates said first enclosure portion cavity with said second enclosure portion cavity;
   a third enclosure portion, wherein said third enclosure portion defines a grid cavity having at least one grid cavity outlet, wherein said third enclosure portion is disposed adjacent to and separated from said second enclosure portion via a third enclosure portion wall, wherein said third enclosure portion wall, includes at least one airflow opening which communicates said second enclosure portion cavity with said third enclosure portion cavity and wherein said third enclosure portion further includes at least one airflow directional device associated with said at least one grid cavity outlet to direct air flowing out of said at least one grid cavity outlet away from said at least one second enclosure portion inlet;
   at least one resistive grid located in said resistive grid cavity for use in a dynamic braking system; and
   at least one transfer duct portion, wherein said at least one transfer duct portion defines a duct cavity having at least one duct inlet and at least one duct outlet, wherein said at least one duct inlet is disposed to be associated with said grid cavity and wherein said at least one duct outlet is disposed within said first enclosure cavity to communicate said grid cavity with said first enclosure cavity.

2. The resistive grid enclosure of claim 1, wherein said at least one second enclosure portion inlet includes a plurality of second enclosure portion inlets.

3. The resistive grid enclosure of claim 1, wherein each of said plurality of second enclosure portion inlets includes a filtration device, wherein said filtration device is a screen mesh.

4. The resistive grid enclosure of claim 1, wherein said at least one grid cavity outlet includes a plurality of grid cavity outlets.

5. The resistive grid enclosure of claim 4, wherein said at least one airflow directional device includes a plurality of airflow directional devices, each of said plurality of airflow directional devices including a plurality of movable louvers.

6. The resistive grid enclosure of claim 5, wherein each of said plurality of movable louvers includes a thin, knifelike edge.

7. The resistive grid enclosure of claim 1, wherein said at least one transfer duct portion includes a plurality of transfer duct portions each of which is disposed relative to said at least one airflow directional device to receive a portion of air being discharged from said at least one airflow directional device and direct said portion of air to said first enclosure portion.

8. The resistive grid enclosure of claim 1, wherein said at least one convection opening includes a plurality of convection openings disposed to be adjacent said at least one airflow opening to recirculate convection airflow with ambient air being drawn within said second enclosure portion.

9. The resistive grid enclosure of claim 1, further comprising an enclosure outer surface, wherein said enclosure outer surface is insulated.

10. A resistive grid assembly for dissipating power generated in a vehicle having a dynamic braking capability, the resistive grid assembly comprising:
a resistive grid enclosure, wherein said resistive grid enclosure defines at least one enclosure inlet, at least one enclosure outlet and a resistive grid cavity, wherein said at least one enclosure inlet is communicated with said at least one enclosure outlet via said resistive grid cavity;
a plurality of resistive grid elements, wherein said plurality of resistive grid elements are disposed within said resistive grid cavity in a plurality of separate element groups;
at least one cooling device comprising a fan configured to generate an airflow incident upon at least one of said plurality of separate element groups; and
at least one air return duct for receiving air from the resistive grid cavity, passing a portion of said air out of the resistive grid enclosure and passing a portion of the air back to the resistive grid cavity as heated recirculated air;
wherein the resistive grid elements are cooled by a mixture of fresh air and heated recirculated air.

11. The resistive grid assembly of claim 10, wherein said plurality of resistive grid elements include twelve resistive grid elements disposed in four separate element groups, wherein each of said four separate element groups include three resistive grid elements.

12. The resistive grid assembly of claim 10, wherein said plurality of separate element groups includes a first element group, a second element group, a third element group and a fourth element group, wherein said first element group is disposed adjacent said second element group and wherein said third element group is disposed adjacent said fourth element group.

13. The resistive grid assembly of claim 12, wherein said first element group and said second element group are separated from said third element group and said fourth element group via said at least one cooling device.

14. The resistive grid assembly of claim 10 wherein each of said at least one enclosure inlet includes a filtration device, wherein said filtration device is a screen mesh.

15. The resistive grid assembly of claim 10, wherein said resistive grid enclosure includes an enclosure outer surface, wherein said enclosure outer surface is thermally insulated.

* * * * *